US009324192B2

(12) United States Patent
Chakravarty et al.

(10) Patent No.: US 9,324,192 B2
(45) Date of Patent: Apr. 26, 2016

(54) REAL-TIME MONITORING OF VEHICLE

(71) Applicant: Tata Consultancy Services Limited, Maharashtra (IN)

(72) Inventors: Tapas Chakravarty, West Bengal (IN); Avik Ghose, West Bengal (IN); Balamuralidhar Purushothaman, Karnataka (IN); Arpan Pal, West Bengal (IN); Arijit Chowdhary, West Bengal (IN)

(73) Assignee: Tata Consultancy Services Limited, Maharashtra (IN)

( * ) Notice: Subject to any disclaimer, the term of this patent is extended or adjusted under 35 U.S.C. 154(b) by 151 days.

(21) Appl. No.: 14/182,833

(22) Filed: Feb. 18, 2014

(65) Prior Publication Data
US 2014/0288766 A1    Sep. 25, 2014

(30) Foreign Application Priority Data

Mar. 20, 2013    (IN) .......................... 897/MUM/2013

(51) Int. Cl.
*G07C 5/00*        (2006.01)
*G05B 23/02*       (2006.01)

(52) U.S. Cl.
CPC .............. *G07C 5/00* (2013.01); *G05B 23/0235* (2013.01)

(58) Field of Classification Search
None
See application file for complete search history.

(56) References Cited

U.S. PATENT DOCUMENTS

| 6,728,604 | B2* | 4/2004 | Ugusa ................. B60R 21/0132 701/1 |
| 6,732,031 | B1 | 5/2004 | Lightner et al. |
| 7,103,460 | B1 | 9/2006 | Breed et al. |
| 2008/0258890 | A1* | 10/2008 | Follmer ................ B60R 25/102 340/439 |
| 2010/0256863 | A1 | 10/2010 | Nielsen et al. |
| 2013/0057696 | A1* | 3/2013 | Felt ........................ H04W 4/22 348/158 |

OTHER PUBLICATIONS

Michele Rota, Floriano Scioscia, Filippo Gramegna, Eugenio Di Sciascio, "A Mobile Knowledge based System for On-Board Diagnostics and Car Driving Assistance" 2010.
Chaitanya Sankavaram, Bharath Pattipati, Anuradha Kodali, Krishna Pattipati, Mohammad Azam, Sachin Kumar, and Michael Pecht, "Model-based and Data-driven Prognosis of Automotive and Electronic Systems" 5th Annual IEEE Conference on Automation Science and Engineering Bangalore, India, Aug. 22-25, 2009.
Abhinav Saxena, Biqing Wu, George Vachtsevanos , " Integrated Diagnosis and Prognosis Architecture for Fleet Vehicles Using Dynamic Case-Based Reasoning" , 2005.

* cited by examiner

*Primary Examiner* — John R Olszewski
*Assistant Examiner* — David Merlino
(74) *Attorney, Agent, or Firm* — Hayes Soloway PC

(57) ABSTRACT

A monitoring unit for vehicle monitoring comprising a receiving module configured to receive data from an OBD, wherein the data is associated with a plurality of jerks detected by a 3-axis accelerometer. The monitoring unit comprises an analytics module configured to compare an intensity of each jerk of the plurality of jerks to a predefined jerk threshold and capture high intensity jerks from the plurality of jerks. The high intensity jerks have intensity equal to or more than the predefined jerk threshold. The method further comprises determining an elapsed time for each of the high intensity jerks. The elapsed time for each of the high intensity jerks is compared to a predefined time threshold. Further it is determined whether an analysis on the high intensity jerks is to be performed at the vehicle or at a server located remotely.

9 Claims, 4 Drawing Sheets

REAL-TIME MONITORING OF VEHICLE

TECHNICAL FIELD

The present disclosure described herein, in general, relates to real-time vehicle health prognosis, and more particularly to real-time monitoring of vehicle health for prognosis using an accelerometer in a complex vehicle-road interaction environment.

BACKGROUND

Road vehicle are primary mode of transport for a majority of the population around the world; the road vehicle includes private vehicle, fleet vehicles or public vehicles. Being the primary mode of transport the vehicles need to be reliable and road worthy, in order to ensure reliability, these vehicles are needed to be maintained and serviced at regular intervals. The use of electronic system like On-Board Diagnostic has made the maintenance of the vehicle easier; in fact the electronic systems help change the focus from break-down maintenance of the vehicle to preventive maintenance of the vehicle.

With the focus shifting to preventive maintenance for the vehicle, several prognosis models were designed in the art that can capture the signals and information from the sensors in the vehicle. The prognosis models were further improved to capture the road conditions and driver behavior in order to develop a more comprehensive model for prognosis, the comprehensive model helped real-time prognosis of vehicle which can be customized for each user or owner. The analysis by the prognosis models on the signals and information captured can be performed at a remote server, wherein the information for the prognosis from vehicle is relayed to the remote server using the communication channels.

However, since the prognosis models are heavily dependent on the signals and information, the information generated from the captured signals is large, large information packets are transferred to the remote server using the communication network. It has been observed that for real-time monitoring of vehicle entire data acquired from chassis vibration having high sampling rates like 40 Hertz (Hz)-300 Hertz (Hz) is required. The transfer of such large packets of information unnecessarily burdens the communication channel and its resources. Further transfer of large packets of information leads to delay in processing of the information as transfer of large packets is time consuming. The delayed analysis of information in critical events is undesirable as the consequence can be more damaging.

Thus, a heretofore unaddressed need exists in the industry to address the aforementioned deficiencies and inadequacies.

SUMMARY

This summary is provided to introduce aspects related to systems and methods for real-time prognosis of vehicles and such aspects are further described below in the detailed description. This summary is not intended to identify essential features of the claimed subject matter nor is it intended for use in determining or limiting the scope of the claimed subject matter.

In one implementation, a monitoring unit for real-time monitoring of a vehicle is disclosed. The vehicle comprises a 3-axis accelerometer installed, to capture signals from a vehicle chassis during a motion. The monitoring unit is coupled to the 3-axis accelerometer, wherein the monitoring unit receives a data from an On-Board Diagnostic (OBD), wherein the data received is associated with a plurality of jerks detected by the three-axis accelerometer coupled to the three-axis accelerometer. In another implementation the 3-axis accelerometer can be embedded in the OBD, or installed independently in the vehicle. An intensity of each jerk of the plurality of jerks is compared to a predefined jerk threshold, wherein high intensity jerks of the plurality of jerks having the intensity same or above the predefined threshold are captured. An elapsed time for the high intensity jerks can be determined and compared to a predefined time threshold, wherein the elapsed time is indicative of a time between an observation of the high intensity jerks and the time required for a feedback to a driver or a user. The monitoring unit can further determine whether an analysis on the high intensity jerks captured, based on the comparison of the elapsed time to the predefined time threshold, is to be performed at the vehicle or at a server located remotely. At the vehicle the analysis may be performed on at least one of the OBD and the other modules installed in the vehicle.

In another implementation, a method for real-time monitoring of a vehicle is disclosed. The method comprising capturing data associated with a plurality of jerks detected by a three-axis accelerometer, wherein the 3-axis accelerometer is embedded in the vehicle configured to capture signals from vehicle chassis. The method further comprises determining an intensity of each jerk of the plurality of jerks detected, wherein the intensity is determined for each jerk of the plurality of jerks is compared to a predefined jerk threshold and high intensity jerks from the plurality of jerks, having the intensity equal to or more than the predefined jerk threshold are captured. Further determining an elapsed time for high intensity jerks from the plurality of jerks captured, wherein the elapsed time is indicative of time between an observation of the jerk and a feedback sent to a user, wherein the elapsed time for high intensity jerks from the plurality of jerks captured is compared to a predefined time threshold. The method further comprises comparing the elapsed time for high intensity jerks from the captured jerk to a predefined time threshold. Determining whether an analysis on the high intensity jerks from the plurality of jerks, based on the comparison of the elapsed time to the predefined time threshold, is to be performed at the vehicle or at a server located remotely. At the vehicle the analysis may be performed on at least one of the OBD and the other modules installed in the vehicle.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
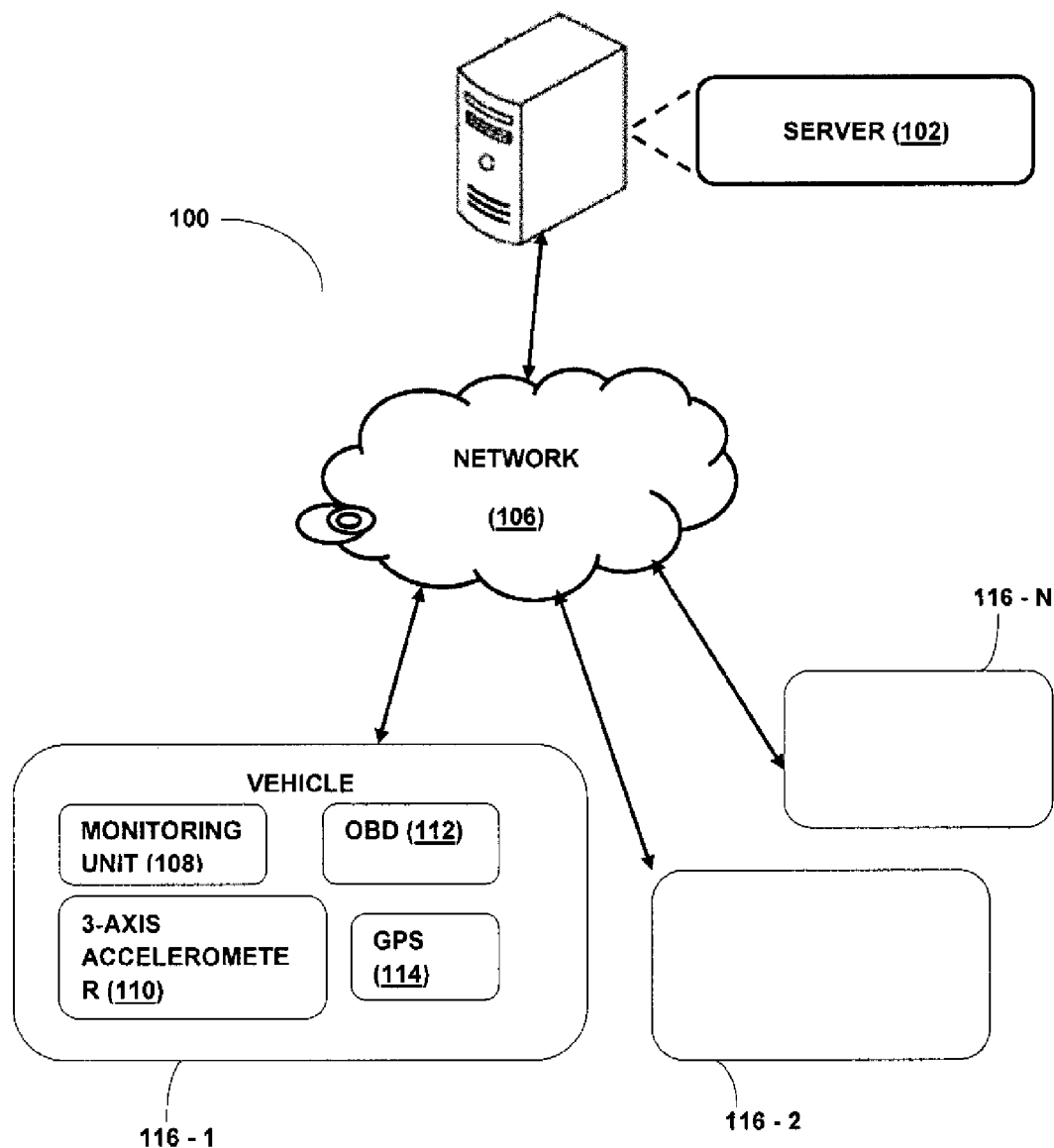
FIG. 1 illustrates a system for real-time monitoring of vehicle, in accordance with an embodiment of the present subject matter.

System and method for real-time monitoring of a vehicle in a road-vehicle interaction is disclosed. It may be understood that the real-time monitoring of vehicle relates to prognosis. The present subject matter enables a user or owner or driver of vehicle/s or any other person to monitor their vehicle/s real-time using optimum sensors to capture signals and reducing amount of data that may be transferred to a remote server for analysis. The present disclosure enables to capture events, occurring during vehicle-road interaction, with specific signatures for prognosis and reporting the event to the interested owner or driver of the vehicle or user subscribing to a service which may be offered by the system.

Specifically, the system may enable prognosis of vehicle health based on the real-time monitoring. Signals and data are captured from various signal acquirers like OBD, 3-axis accelerometer and/or GPS, and received by a receiving module or detection tool, wherein the receiving module may be mounted in tandem with OBD or on an independent hardware comprising a processor and memory. The receiving module may capture signals and data pertaining to a jerk from chassis dynamics of the vehicle using the 3-axis accelerometer, wherein the 3-axis accelerometer can be mounted in a fixed orientation, in the OBD or independently or in GPS. The detection tool or receiving module may simultaneously capture data from the OBD, 3-axis accelerometer and GPS. The GPS according to present disclosure may enable location stamping on an event of interest based upon the signature of the signals or the data received for the event. The event can be defined in term of high intensity jerks captured: high intensity jerks captured can have intensity same or more than a predefined threshold. The intensity for the jerk is computed using standard signal and data processing techniques. The GPS and the 3-axis accelerometer can work in tandem or independently based upon their interaction with the detection tool or the receiving module. The captured signals or data by the OBD are associated with the high intensity jerks capture or the event.

The detection tool can further be communicably connected to an identification tool set which can also be called as analytic module based on the function performed. The identification tool set can perform two functions; determine whether the event is critical and determine the probability of the event occurring again. The identification tool set after determining whether the event is critical or not, determines whether to perform the analysis on the signals at the vehicle end or at the server end. Determining where to perform analysis helps reduce the size of data sample and amount of data sent in packets to the server for the event can be optimized; it is estimated that real-time monitoring of the vehicles using chassis dynamics can require entire acquired data from the signals with high sampling rates like 40 Hertz (Hz)-300 Hertz (Hz).

The critical events can be defined by the objective for monitoring of the vehicle, simulating using a test harness. According to an embodiment of the present disclosure chassis dynamics like 'yaw', 'roll' and 'pitch' are monitored real-time for the critical events. The test harness can be a test automation engine that may be implemented by way of a recursive module. The input to the test harness may be a set of configuration parameters defining the state of the system like vehicle type, road type, vehicle speed, total mass, location, time. The configuration parameters of the test harness simulate the probability of anomaly detection for the given set of input parameters. The test harness may automates analytics process and achieve better sacrificing accuracy. To ensure greater accuracy, one may use historical data and other related contextual information that may be available.

According to an embodiment the identification tool set may adopt an identification methodology wherein, the vertical vibration along the Z-axis may be capture by the accelerometer. The vibration may be converted into a windowed jerk i.e. jerks in a particular time window. The jerk captured may be caused by a plurality of events like road pothole, harsh driving and/or roll. Therefore to understand the exact cause of the jerk a 3-axis accelerometer may be used to capture the vibration along the three axes of Cartesian coordinates. The probability of event occurrence may be computed based on a simulated model and corroborated by experiments. Raw-data in time domain is captured for the event using the accelerometer and may be converted into a frequency domain using relevant signal processing techniques, further a probability may be derived for occurrence for each event followed by obtaining a joint probability of all such events to deduce an overall probability of occurrence of the critical event. The present disclosure may cluster the joint probability for improved deduction of the critical event. According to an embodiment of the present disclosure for computation of a critical event occurrence, the system may compare the amplitude threshold and/or spectrum shift.

While aspects of described system and method for real-time monitoring of the vehicle may be implemented in any number of different systems, environments, and/or configurations, the embodiments are described in the context of the following exemplary system.

Referring now to FIG. 1, for a system 100, for real-time monitoring of a vehicle 116 (or vehicles 116-1, 116-2 . . . , 116-n). The vehicle 116 may be coupled to a remote server 102 through a network 106. A plurality of vehicles 116-1, 116-2 . . . , 116-n may be coupled to the server 102 through network 106. The vehicle 116 further comprise a monitoring unit 108 coupled to a 3-axis accelerometer 110. The 3-axis accelerometer 110 is configured to capture signals from a chassis of the vehicle 116. The 3-axis accelerometer 110 can be installed in the vehicle 116. The signals captured by the 3-axis accelerometer 110 are processed into a jerk with a quantifiable intensity using standard signal processing techniques.

The monitoring unit 108 may be further coupled to an On-Board diagnostic (OBD) 112, wherein the OBD is connected to plurality of sensors mounted in the vehicle. The plurality of sensors provides continuous feedback to the OBD pertaining to vehicle performance and other vehicular systems. The monitoring unit 108 is further coupled to a global position system (GPS) 114, wherein the GPS may imprint a position stamp on the jerk.

In one implementation, the network 106 may be a wireless network, a wired network or a combination thereof. The network 106 can be implemented as one of the different types of networks, such as intranet, local area network (LAN), wide area network (WAN), the Internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
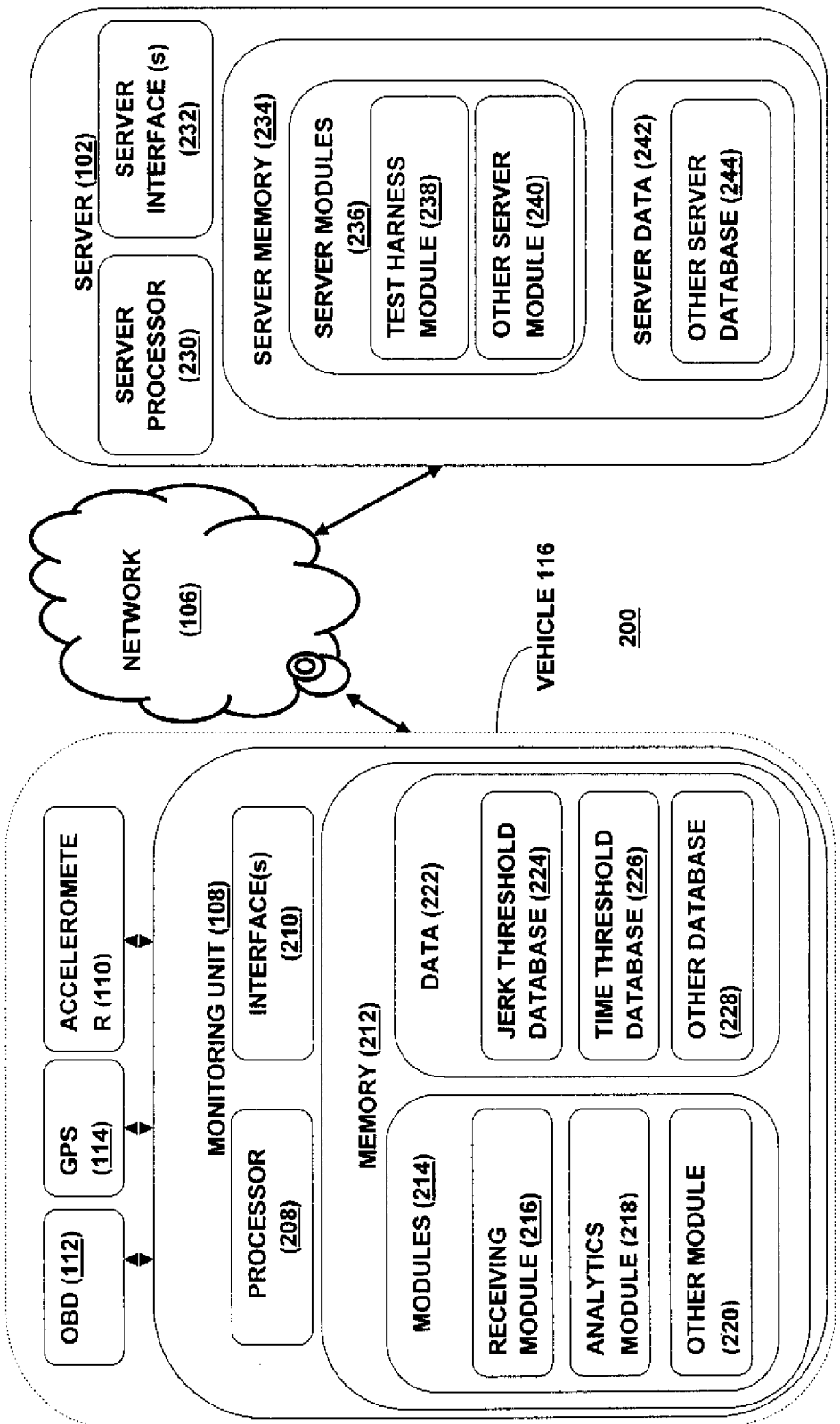
FIG. 2 illustrates the system of the FIG. 1, in accordance with an embodiment of the present subject matter.

Referring now to FIG. 2, the vehicle 116 is illustrated in accordance with an embodiment of the present subject matter. In one embodiment, the vehicle 116 may include a monitoring unit 108, an accelerometer 110, an OBD 112, and a GPS 114. The monitoring unit 108 comprises at least one processor 208, an input/output (I/O) interface 210, and a memory 212. The at least one processor 208 may be implemented as one or more microprocessors, microcomputers, microcontrollers, digital signal processors, central processing units, state machines, logic circuitries, and/or any devices that manipulate signals based on operational instructions. Among other capabilities, the at least one processor 208 is configured to fetch and execute computer-readable instructions stored in the memory 212.

The I/O interface 210 may include a variety of software and hardware interfaces, for example, a web interface, a graphical user interface, and the like. The I/O interface 210 may allow the monitoring unit 108 to interact with an accelerometer 110, the GPS 114 and/or OBD 112. The I/O interface 210, may further enable the monitoring unit 108 to communicate to server 102 or other computing devices, such as web servers and external data servers (not shown) through network 106. The I/O interface 210 can facilitate multiple communications within a wide variety of networks and protocol types, including wired networks, for example, LAN, cable, etc., and wireless networks, such as WLAN, cellular, or satellite. The I/O interface 210 may include one or more ports for connecting a number of devices to one another or to another server.

The memory 212 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 214 and data 222.

The modules 214 include routines, programs, objects, components, data structures, etc., which perform particular tasks or implement particular abstract data types. In one implementation, the modules 214 may include a receiving module 216, an analytics module 218, and other modules 220. The other modules 220 may include programs or coded instructions that supplement applications and functions of the monitoring unit 108. The receiving module 216 and analytics module 218 may perform the same function of the detection tool and identification tool set respectively.

The data 222, amongst other things, serves as a repository for storing data processed, received, and generated by one or more of the modules 214. The data 222 may also include a Jerk threshold database 222, a time threshold database 226 and other data 228. The other data 228 may include data generated as a result of the execution of one or more modules in the other module 220.

In one embodiment, a 3-axis accelerometer 110 captures a signal pertaining to chassis dynamics of the vehicle 116. The signal captured by the 3-axis accelerometer 110 for chassis dynamics of the vehicle 116 is at least on one of an X-axis, a Y-axis, and a Z-axis of a Cartesian Co-ordinate system. The receiving module 216 receives the signal captured by the 3-axis accelerometer 110 and may convert the signal into a plurality jerks detected having an intensity using standard signal processing technique known in the art. The analytics module 218 receives the plurality of jerks and compares the intensity of each of the jerk to a predefined jerk threshold stored in the jerk threshold database 224. The analytics module 218 may capture high intensity jerks from the plurality of jerks, wherein the high intensity jerks have an intensity level equal to or more than the threshold. For each of the high intensity jerks, the analytics module 218 determines elapsed time. The elapsed time is indicative of a time between an observation of the high intensity jerks and time required for a feedback to a driver or a user. The elapsed time according to an embodiment of the disclosure is captured at a preset delay enabling the comparing of the elapsed time to predefined time threshold stored and retrieved from the time threshold database 226.

The analytics module 218, further determines a location to perform or execute analytics on the high intensity jerks captured based upon the elapsed time. The location for performing the analysis may be at the vehicle 116 or at a server located remotely. The analysis may be performed at the location selected from the OBD, or other module 220 embedded in the processor 208. For example, in an emergency scenario when a very quick response is required, analysis can be performed in the OBD, in order to reduce latency of detection and alert; whereas other scenarios like driving pattern assessment, where feedback is tolerant of time intervals, for say 1 hour, a major part of the analysis can be performed in the server. Further the analytics module 218, is configured to receive an position stamp for the high intensity jerks, from the GPS 114.

The analytics module 218 is further configured to receive signals and data from the OBD 112. The signals received from the OBD may relate to the vehicle performance or vehicle system. The signals from the OBD are captured in real-time and may be stored. The data received from the OBD, may be stored to perform analysis in order to understand the exact nature and/or cause for the high intensity jerks. Understanding the nature of the high intensity jerk helps understand the effects on the prognosis and diagnosis of the vehicle.

Referring to FIG. 2, a server 102 is illustrated in accordance with an embodiment of the present subject matter. In one embodiment, the server 102 may include at least server processor 230, server input/output (I/O) interface 232, and server memory 234. The at least one server processor 230 may be implemented as one or more microprocessors, microcomputers, microcontrollers, digital signal processors, central processing units, state machines, logic circuitries, and/or any devices that manipulate signals based on operational instructions. Among other capabilities, the at least one server processor 230 is configured to fetch and execute computer-readable instructions stored in the server memory 234.

The server I/O interface 232 may include a variety of software and hardware interfaces, for example, a web interface, a graphical user interface, and the like. The server I/O interface 232 may further enable the server 102 to communicate to the vehicle 116 or other devices, such as web servers and external data servers (not shown) through network 106. The server I/O interface 232 can facilitate multiple communications within a wide variety of networks and protocol types, including wired networks, for example, LAN, cable, etc., and wireless networks, such as WLAN, cellular, or satellite. The server I/O interface 232 may include one or more ports for connecting a number of devices to one another or to another server.

The server memory 234 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The server memory 234 may include server modules 236 and server data 242.

The server modules 236 include routines, programs, objects, components, data structures, etc., which perform particular tasks or implement particular abstract data types. In one implementation, the server modules 236 may include a test harness module 238, and other server modules 240. The other server modules 240 may include programs or coded instructions that supplement applications and functions of the server 102.

The server data 242, amongst other things, serves as a repository for storing data processed, received, and generated by one or more of the server modules 236. The server data 242 may also include other server database 244. The other server database 244 may include data generated as a result of the execution of one or more modules in the other server module 240.

The test harness module 238 receives the high intensity jerks captured and data associated with the high intensity jerks from the vehicle 116 via the network 106. The test harness module 238, analyzes the data received and the high intensity jerks. The test harness module 238 using a simulation model deduces the exact cause for the high intensity jerks and nature of the high intensity jerks. The simulation model comprises a set of historical data collected and stored in other database 244, wherein the set of historical data is collected over a preset time period. The simulation model may further be corroborated by experimentation data. The test harness module 238, further determines the probability for re-occurrence of the high intensity jerks. The probability is based on a probabilistic model, wherein the probabilistic model may comprise of the historical data and other contextual data captured from a plurality of sources. The plurality of sources can be a plurality of vehicle coupled to the server.

Figure 3:
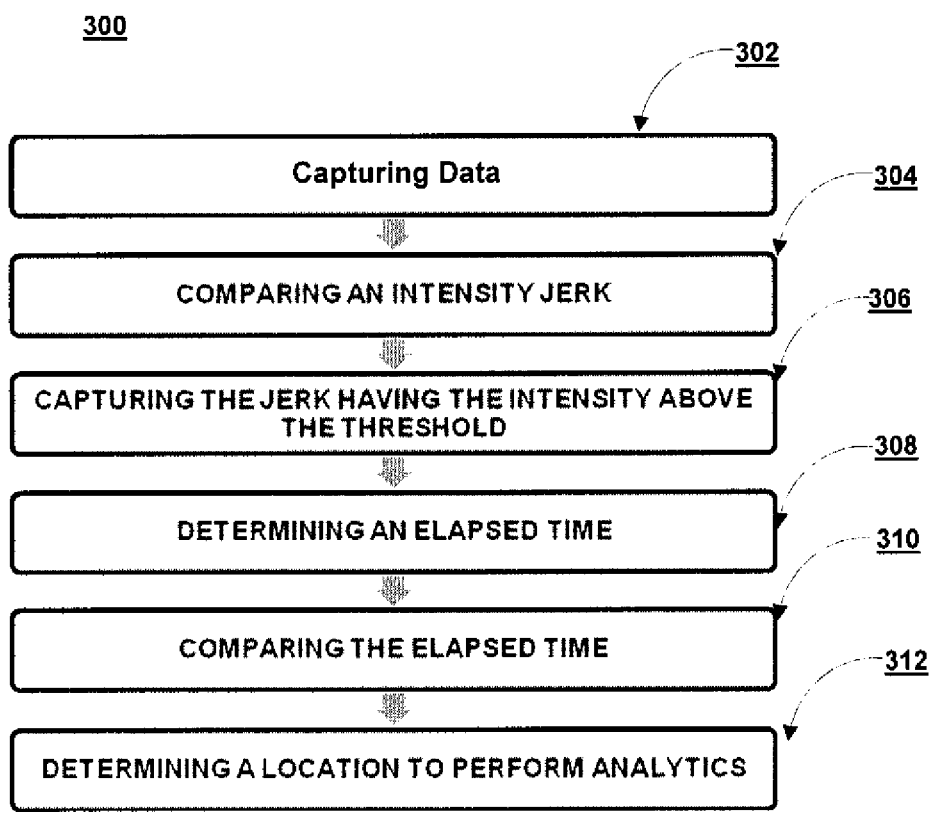
FIG. 3 is a flowchart illustrating a method for real-time monitoring of a vehicle, in accordance with an embodiment of the present subject matter.

Referring now to FIG. 3, a flowchart illustrating a method for real-time monitoring of a vehicle, in accordance with an embodiment of the present subject matter. The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described vehicle monitoring unit 108.

At block 302, a plurality of signals is captured by a 3-axis accelerometer 110 pertaining to chassis dynamics of a vehicle. The captured plurality of signals is received by a receiving module 218, wherein the receiving module 218 converts the plurality of signals received into a plurality of jerks detected having intensity. To convert the signal into the jerk detected standard signal processing techniques may be employed.

At block 304, the intensity for each of the jerk of the plurality of the jerk is compared to a predefined jerk threshold by an analytic module 218. At block 306, high intensity jerks is captured, wherein the high intensity jerks have intensity same or above the predefined jerk threshold. At block 308 the time elapsed for the high intensity jerks is determined. The elapsed time indicates the time taken when the high intensity jerks is detected till the time required to provide a feedback to the driver or the user. The elapsed time is compared to elapsed time threshold at Block 310. At block 312 the high intensity jerks captured is mapped with corresponding elapsed time and a location is determined for further analysis of the captured data. The location for further analysis can be the vehicle or a server.

Figure 4:
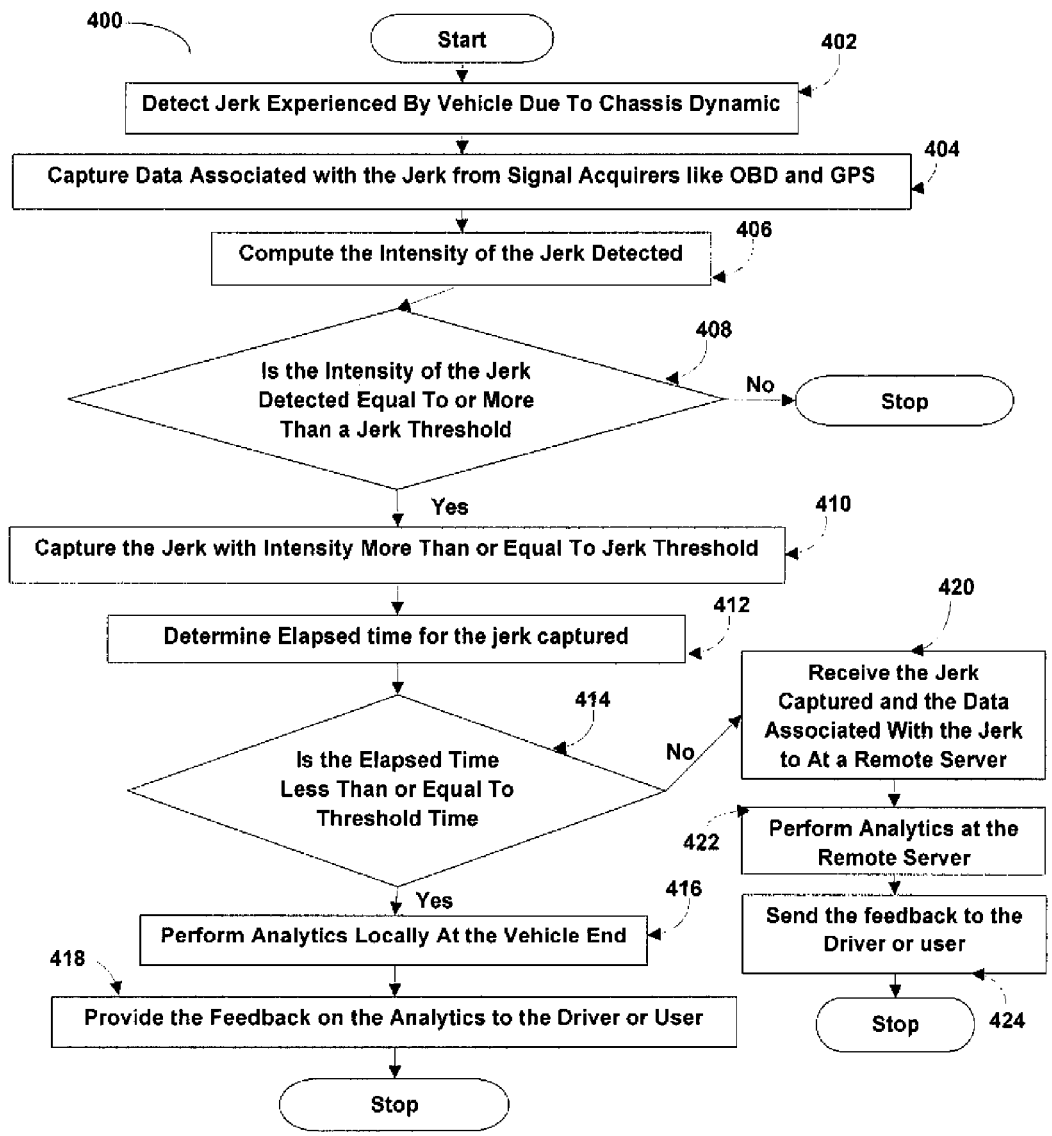
FIG. 4 is a flowchart illustrating real-time monitoring of a vehicle, in accordance with an embodiment of the present subject matter

Referring now to FIG. 4, a flowchart illustrating real-time monitoring of a vehicle, in accordance with an embodiment of the present subject matter. The flow chart 400 illustrates an exemplary process flow enabling a monitoring unit to monitor the vehicle real-time. At Block 402, a plurality of jerks, experienced by the vehicle due to chassis dynamics, are detected by a three-axis accelerometer. Data associated with the plurality of jerks detected may also be captured at the Block 404. The data associated can be captured from various data and signal acquirers like On-Board Diagnostic system, a GPS, or an Electronic Control Unit (ECU) or a combination thereof. In the next step of the flow chart 400 at Block 406, intensity for each jerk of the plurality of jerk is determined by standard data and signal processing techniques. The intensity determined for each of the plurality of jerks and is compared to a jerk threshold at Block 408, wherein high intensity jerks having intensity more than or equal to the jerk threshold are captured at Block 410.

At Block 412, an elapsed time is determined for the high intensity jerks captured in the Block 410. At Block 414, the elapsed time for the high intensity jerks is compared to time threshold, wherein the high intensity jerks having elapse time less than or equal to the time threshold proceed to Block 416 or else they proceed to Block 420. The time threshold may depend upon parameters defined by a user or the driver or both. Comparing of the elapse time with time threshold enables a monitoring unit to decide whether to perform analytics, on the high intensity jerks captured, at the vehicle or at a server located remotely or both i.e. partially at the vehicle and partially at server. At Block 416 the analytics can be performed locally in the vehicle, wherein the OBD or any other device capable of processing installed in the vehicle performs the computation or analytics. The data captured and associated with the high intensity jerks may be used for analytics. The data associated may be captured real-time or can be retrieved from historical data. At Block 418, a feedback based on the analytics performed is sent to the driver or user.

At Block 420, the high intensity jerks captured having elapse time greater than time threshold is received at the remote server. The data associated with the high intensity jerks may also be received, wherein the further analytics are performed and exact nature for the high intensity jerks is determined at the Block 422. At Block 424, a feedback based on the analytics is sent to the driver or user or participating vehicle or combination thereof.

The written description describes the subject matter herein to enable any person skilled in the art to make and use the embodiments of the disclosure. The scope of the subject matter embodiments are defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

We claim:

1. A system for real-time monitoring of a vehicle, the system comprising:
   an On-Board Diagnostic (OBD);
   a three-axis accelerometer coupled to the OBD; and
   a monitoring unit comprising:
      a processor; and
         a memory coupled to the processor, wherein the memory comprises a plurality of modules capable of being executed by the processor, and wherein the plurality of modules comprises:
            a receiving module configured to receive data from the OBD, wherein the data is associated with a plurality of jerks detected by the three-axis accelerometer coupled to the OBD; and
         an analytics module configured to:
            compare an intensity of each jerk of the plurality of jerks to a predefined jerk threshold;

capture at least one high intensity jerk of the plurality of jerks, wherein the at least one high intensity jerk has an intensity of at least the predefined jerk threshold;

determine an elapsed time for each of the at least one high intensity jerk, wherein the elapsed time is indicative of a time between an observation of the at least one high intensity jerk and a feedback sent to a user;

compare the elapsed time for each of the at least one high intensity jerk to a predefined time threshold; and determine whether an analysis on the at least one high intensity jerk, based on the comparison of the elapsed time to the predefined time threshold, should be performed at the vehicle or at a server located remotely from the vehicle.

2. The system of claim 1, wherein the three-axis accelerometer is communicatively couple to the monitoring unit and is further configured to capture chassis dynamics of the vehicle on at least one of: an X-axis, a Y-axis, and a Z-axis of a Cartesian coordinate system.

3. The system of claim 1, wherein the data comprises at least one of: the intensity of each jerk of the plurality of jerks, a ratio of jerk to acceleration of the vehicle, a ratio of acceleration of the vehicle to velocity of the vehicle, a power spectral density, a wavelet transform, a ratio of an x-axis acceleration to a y-axis acceleration, a ratio of the x-axis acceleration to a z-axis acceleration followed by a jerk computation, a ratio of the z-axis acceleration to the y-axis acceleration followed by the jerk computation, a dominant frequency estimation on the ratio of the x-axis acceleration to the y-axis acceleration, and an identified change in a loaded natural frequency of the vehicle.

4. The system of claim 1, wherein the analytics module is further configured to receive a position stamp of the vehicle for the at least one high intensity jerk from a Global Positioning System (GPS) unit.

5. The system of claim 1, wherein at least one of: the OBD communicatively couple to the monitoring unit, and another module installed in the system is adapted to perform the analysis of the at least one high intensity jerk.

6. A method for real-time monitoring of a vehicle using a computerized device having a processor, the method comprising:

receiving data associated with a plurality of jerks detected by a three-axis accelerometer, wherein the three-axis accelerometer is embedded in the vehicle and configured to capture at least one signal from a vehicle chassis;

comparing an intensity of each jerk of the plurality of jerks to a predefined jerk threshold;

capturing at least one high intensity jerk of the plurality of jerks, wherein the at least one high intensity jerk has an intensity of at least the predefined jerk threshold;

determining an elapsed time for each of the at least one high intensity jerk of the plurality of jerks, wherein the elapsed time is indicative of a time between an observation of the at least one high intensity jerk and a feedback sent to a user;

comparing the elapsed time for each of the at least one high intensity jerk to a predefined time threshold; and determining whether an analysis on the at least one high intensity jerk, based on the comparison of the elapsed time to the predefined time threshold, should be performed at the vehicle or at a server located remotely from the vehicle, and wherein at least one of the steps of: receiving the data, comparing the intensity, capturing the at least one high intensity jerk, determining the elapsed time, comparing the elapsed time, and determining the analysis is performed by a processor.

7. The method of claim 6, further comprising receiving a position stamp of the vehicle for the at least one high intensity jerk from a Global Positioning System (GPS).

8. The method of claim 6, wherein the data is received from an On-Board Diagnostic (OBD).

9. A computer program product having embodied thereon a computer program for real-time monitoring of a vehicle, the computer program product comprising:

a program code for receiving data associated with a plurality of jerks detected by a three-axis accelerometer, wherein the three-axis accelerometer is embedded in the vehicle and configured to capture at least one signal from a vehicle chassis;

a program code for comparing an intensity of each jerk of the plurality of jerks to a predefined jerk threshold;

a program code for capturing at least one high intensity jerk of the plurality of jerks, wherein the at least one high intensity jerk has an intensity of at least the predefined jerk threshold;

a program code for determining an elapsed time for each of the at least one high intensity jerk, wherein the elapsed time is indicative of a time between an observation of the at least one high intensity jerk and a feedback sent to a user;

a program code for comparing the elapsed time for each of the at least one high intensity jerk to a predefined time threshold; and a program code for determining whether an analysis on the at least one high intensity jerk, based on the comparison of the elapsed time to the predefined time threshold, should be performed at the vehicle or at a server located remotely from the vehicle.

\* \* \* \* \*